2,865,177

PROCESS FOR SOLIDIFYING POROUS MATERIALS

Robert J. Gnaedinger, Oak Park, Ill., assignor, by mesne assignments, to Chemject Corporation, Chicago, Ill., a corporation of Illinois No Drawing. Application July 7, 1954
Serial No. 441,921

1 Claim. (Cl. 61—36)

This invention relates to a new and novel chemical admixture and process for increasing the compressive strength and shear strength of porous materials and decreasing the fluid permeability of the same.

More particularly, this invention is concerned with novel chemical solutions and methods which can be used to impregnate natural soils, construction materials and the like having voids therein, said solutions polymerizing after impregnation and gelling in situ to solidify and strengthen such materials having erstwhile loose, low strength characteristics, and to substantially decrease or eliminate the fluid permeability of all porous media so impregnated.

In the drilling and digging of ditches, tunnels, mine shafts, building foundations and the like, the construction of bridges and dams requiring the sinking of caissons, and in the maintenance of existing structures and earthworks such as enumerated above, it often becomes necessary to strengthen the supporting or surrounding media and to decrease the permeability of said media to water, gas or oil seepage.

For example, floors, walls and ceilings located below ground and especially below the water table frequently permit the seepage of water, either because of their inherent porosity or because of cracks and holes which develop therein, or both.

The problem of water seepage is a source of constant harassment to many homeowners whose cellar foundations are in contact with sub-surface water. A similar circumstance is encountered in mines, tunnels, underpasses and the like, where water seepage creates safety hazards as well as creating costly delays in business operations.

A few prior attempts have been made to solve the above problems with varying degrees of success, but each of such attempts has failed to produce a satisfactory, enduring and practical solution to the problems, nor does any provide a process having the requisite versatility.

One prior method, for example, involves the sinking of perforated pipes into a porous earth to be solidified, then pumping through these pipes suspensions of Portland cement and water, permitting the cement to subsequently set in situ. This method has been found to be unsatisfactory in many cases because the porous earth filters out the cement suspension and impedes penetration of the latter into the former, thus limiting the applicability of such method.

Another prior method employs the separate injection of two or more salt solutions into the porous earth with the desideratum that such solutions will intermix in situ and combine to form a siliceous gel. Mixing of the said solutions is incomplete and the solid product tends to form in layers with intermediate areas of unreacted materials readily permeable to water.

Still another method suggests the use of pre-mixed materials which are then injected in colloidal suspension to subsequently coagulate in situ to form a siliceous gel.

In practice the above siliceous materials have not proven entirely satisfactory due to the fact that in time they may lose their water of gelation and decompose to their basic constituents.

In order to overcome the deficiencies in the prior art, the present invention involves the use of aqueous solutions of certain polymerizable organic monomers as penetrating media. Such solutions penetrate the material to be treated and then are polymerized in situ to form polymers and copolymers which then form a gelatinous mass throughout said material. These organic monomers are calcium acrylate, acrylamide (a substitute acrylamide such as methylol acrylamide may be used), and methylene bis acrylamide, a blend of acrylamide and methylene bis acrylamide being available commercially in a blend of about 95 to 5% by weight respectively. Such blend is referred to as "AMBA" or "AM955" and is a product of the American Cyanamid Company Water-soluble to a clear solution, these monomers may be polymerized at room temperature by a redox catalyst such as ammonium persulfate and sodium thiosulfate, by a peroxide catalyst such as acetyl peroxide, benzoyl peroxide, hydrogen peroxide, tert-butyl hydroperoxide, tert-butyl perbenzoate, or by ammonium persulfate or potassium persulfate alone.

In accordance with the present invention aqueous solutions of the above monomers are prepared in varying amounts and proportions, and including certain other catalysts and additives, to provide soil-impregnation mixtures with improved penetrating properties, optimum polymerizing properties, and resultant copolymers and gels of enhanced, particular characteristics such as shear strength, compression resistance, chemical and physical stability, and fluid impermeability.

Since the impregnation mixtures of the present invention are in solution rather than merely in suspension as some of the prior art mixtures, the shortcomings of the latter due to filtration of the suspended matter by the material being impregnated are not encountered. In addition, all reactive constituents are impregnated simultaneously in the same solution. No separate injection is required, and there is no problem of inadequate mixing of such constituents in situ. It is readily apparent that with the present solutions better penetration is achieved and a homogeneous gelatinous mass is uniformly dispersed throughout the porous material. Furthermore, the present gels have good physical stability, e. g. they do not shrink, and have good chemical stability, e. g. they do not readily decompose but on the contrary have a long useful life.

"Porous material" as used herein means media such as quicksand, sand, gravel, porous rock of all kinds, earth fills, concrete, masonry and other artificially produced porous strata, and the like.

The above acrylic monomers are characterized by the property of polymerizing at substantially room temperature in the presence of the catalysts above enumerated. The rate of polymerization and the rate of gelation are dependent on temperature and concentration of the aqueous solution. Consequently, the latter two variables may be adjusted to provide the desired results in any particular situation. Normally, however, it has been found that it is usually desirable to have a setting time of up to about two hours, and concentrations are adjusted for operation within such a time range at ambient temperatures.

It has been discovered that oxygen or air has a somewhat deleterious influence on the polymerization of these monomers and that sodium thiosulfate, or "hypo" when present in a minor amount in the aqueous solution effectively counteracts such influence. Typical amounts of "hypo" anti-oxidant employed are set forth in the several examples hereinafter disclosed.

Any one of the polymerization catalysts mentioned above may be used, but for optimum results from a practical as well as an economic standpoint, ammonium persulfate is preferred herein. Such catalyst is used in minor amounts, also shown in the examples below.

In order to obtain better chemical wetting of the porous materials, especially when in essentially basic environments, such as a crushed limestone back-fill, or for purposes of further cross-linking of the polymers, or for carbon dioxide release, both of the latter uses being discussed below, the introduction of anionic or acidic groups has been found to give improved results. For such purposes one of the acrylic acids may be used, methacrylic acid, for example. It is believed that the acid reacts with the basic constituents of the porous material being impregnated and thus covers the surfaces of said material, presenting organophilic groups to the organic elements of the accompanying polymeric gelatinous mass, providing improved adherence of the said mass to said material.

The usual range of methacrylic acid employed is from about 3% to about 30% by weight of the other polymerizable materials (e. g., calcium acrylate, methylol acrylamide and methylene bis acrylamide) although the amount may vary through wide limits depending on the particular conditions encountered.

When a gel of increased compressive and shear strength is required, it has been discovered that such properties can be achieved by developing substantially greater cross-linking between polymeric groups. The addition of any of a wide variety of olefinic polyamines to the monomeric solution containing the methacrylic acid of above provides such cross-linking. Some of the polyamines which have been found useful for this purpose are ethylene diamine, diethylene triamine, triethylene tetramine, propylene diamine, hexylene diamine, and the like. Ratios of polyamine to methacrylic acid range down from one alpha amino radical ($NH_2-$) per mole of methacrylic acid.

A new and novel method of obtaining greater penetration of porous materials has been discovered in which a monomeric solution as above described, and having a minor amount of methacrylic acid therein, has added to it a substance yielding carbon dioxide gas in the presence of acid, for example, sodium bicarbonate. The bicarbonate is added immediately prior to impregnation and the subsequent generation of the gas in situ develops an additional gas pressure which disperses the solution farther into the penetrated porous material before polymerization has been carried to completion and gelation has occurred. When calcium carbonate is used for the above purpose, a gel of increased strength is obtained. It is believed that such increased strength is due to an increase in cross-linking stemming from the reaction between the calcium carbonate and the acid.

When porous material such as loose gravel or sand is to be impregnated with any of the above solutions it is necessary to control the extent of penetration of solution into said material to prevent drainage of the solution away from the area intended to be fortified before polymerization and gelation can occur, and thus to minimize the cost of impregnating limited areas of such porous materials.

It has been found that by adding materials such as polyvinyl alcohol, methyl cellulose, and carboxy methyl-sodium cellulose to any of the above solutions, the viscosity of the impregnation solution can be substantially increased with a consequent decrease in the distance of penetration, without any appreciable effect on the time of gelation or the physical properties of the gel once formed. By adding the proper amount of such materials the viscosity of the impregnation solution can be adjusted to suit the particular porosity conditions encountered.

From the above description it is apparent that the impregnation of porous materials can now be achieved much more effectively and efficiently, and the mixtures herein have been discovered which provide the versatility required for applicability of said mixtures to changing environments and conditions.

The methods of the present invention for effecting impregnation of porous materials with any of the above solutions are many and varied, the objective being to fill as many of the interstices of the porous material with solution as possible. Some illustrative methods of impregnation are herewith set forth with the understanding that similar methods may be utilized in similar situations.

Where there is a leakage through a basement wall or floor, tunnel, wall, ceiling or floor, and similar situations the first step is to form at least one passageway through the wall or floor in the vicinity of the leakage. Next, a conduit is placed in each passageway and the area between the outside of the conduit and the passageway is made as water tight as possible by some means such as packing said area with rubberized material. Then the properly prepared solution is forced or injected through said conduit or conduits into the porous material adjacent the structure.

As pointed out above, it has been found that the time of polymerization and gelation of the solution is controlled by the type and quantity of catalyst used and the temperature of the solution and therefor it may be desirous in some instances to control the temperature of the solution as it enters the porous material. This control can be accomplished by heating or cooling the conduit through which the solution passes before entering the porous material.

Rather than passing all the way through the structural members as set forth above it may be desired to render the structural member itself less permeable by impregnating said member with solution, the member also being broadly termed a porous material. Where the porous material to be treated constitutes, for example, a concrete wall, the conduits are embedded in the wall, which embedding can be accomplished by boring holes part way through the wall and packing the conduits in said holes and injecting the solution into the wall.

Where it is desired to decrease the permeability and increase the solidity of a surface of soil, quick-sand, or a rock formation the conduit used may be a "well-point" which can be driven into the surface and the solution is injected through the well-point into the surrounding porous material.

Specific illustrations of conditions which may be encountered and the specific methods of treatment for decreasing the permeability and increasing the solidity in each instance are set forth below.

*Example I*

*Condition.*—Fairly wide cracks in floors, walls, or ceilings.

*Treatment.*—Imbedding at least one conduit in the floor, wall or ceiling near the cracks, preparing an aqueous solution in 50 gallons of water of 20 pounds methylol acrylamide, 1 pound methylene bis acrylamide, 25 pounds calcium acrylate, 1.4 pounds ammonium persulfate, and 2.2 pounds sodium thiosulfate, the constituent materials are thoroughly mixed and dissolved in the water, and then the solution is injected through the conduit or conduits into the floor, walls, or ceiling in the above described manner. The polymerization and gelation time is about thirty minutes.

*Example II*

*Condition.*—Porous "back-fill" material behind a floor, wall or ceiling.

*Treatment.*—Forming at least one passageway through the floor, wall or ceiling, packing a conduit in each passageway, preparing a solution as in Example I with the addition of 1 pound of methyl cellulose of 4000 centipoise viscosity to control the penetration and dispersion of the solution, and injecting the solution through the conduit or conduits into the porous "back-fill" material. The polymerization and gelation time is unaffected as compared with Example I.

*Example III*

Condition.—Alkaline condition of porous material, such as an alkaline concrete porous wall.

Treatment.—Follow the treatment of Example I, adding to the solution prior to injection 1.4 pounds of methacrylic acid.

*Example IV*

Condition.—A porous and unstable excavation base where greater solidity and shear strength is of primary importance.

Treatment.—Imbedding at least one conduit in the base, preparing an aqueous solution in 50 gallons of water of 20 pounds methylol acrylamide, 1 pound methylene bis acrylamide, 25 pounds calcium acrylate, 1.4 pounds ammonium persulfate, 2.2 pounds sodium thiosulfate, 1.4 pounds methacrylic acid and 1.1 pounds propylene diamine, the constituent materials are first thoroughly dissolved in the water, and the solution is then injected through the conduit or conduits into the base. A firmer, faster-setting gel is formed due to the addition of the propylene diamine.

*Example V*

Condition.—Fine cracks in floors, walls or ceilings.

Treatment.—Follow the treatment of Example III adding and mixing into solution immediately prior to injection, 3 pounds of sodium bicarbonate. A solution which expands into the fine cracks just prior to gelation results.

While specific examples and details have been set forth in the foregoing description, the latter is not to be taken as limited thereto, but on the other hand many modifications within the scope of the appended claim will be apparent to those skilled in the art.

I claim:

A method of reducing the permeability and increasing the solidity of porous material which comprises impregnating said material with an aqueous solution of acrylamide, methylene bis acrylamide and calcium acrylate having weight percentages based on the total weight of these constituents of from about 95 to 28.5%, 5 to 1.5%, and up to 70% respectively, and increasing the penetration of said solution into said material by incorporating therein just prior to said impregnation preselected equivalent minor amounts of methacrylic acid and sodium bicarbonate, whereby gaseous pressure is generated which enhances penetration of said solution into said material to a predetermined degree.

References Cited in the file of this patent

UNITED STATES PATENTS

| | | |
|---|---|---|
| 1,009,159 | Lodwick | Nov. 21, 1911 |
| 2,651,619 | De Mello et al. | Sept. 8, 1953 |

OTHER REFERENCES

Alexander: Colloid Chemistry, volume VI, Reinhold Publishing Corp., New York (1946), pages 926–932.

Barker et al.: "Impermeabilization of Soils by the Injection of Monomer Pairs to Form Swelling Copolymers," May 25, 1953.